(12) United States Patent
Tsutsumi

(10) Patent No.: US 6,598,818 B2
(45) Date of Patent: Jul. 29, 2003

(54) FISHING REEL

(75) Inventor: Wataru Tsutsumi, Saitama (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 09/983,080

(22) Filed: Oct. 23, 2001

(65) Prior Publication Data

US 2003/0075631 A1 Apr. 24, 2003

(51) Int. Cl.[7] .......... A01K 89/00; A01K 89/01; A01K 89/015
(52) U.S. Cl. .......... 242/263; 242/255; 242/319
(58) Field of Search .......... 242/263, 319, 242/241, 242, 255; 464/180, 179, 182

(56) References Cited

FOREIGN PATENT DOCUMENTS

JP           9-313079           12/1997

*Primary Examiner*—Kathy Matecki
*Assistant Examiner*—Evan Langdon

(74) *Attorney, Agent, or Firm*—Sughrue Mion, PLLC

(57) ABSTRACT

An outer periphery of the other side of a rotating shaft (2a) of a rotating member (2) is pivotally supported via a hollow cylindrical portion (3a) of a gear (3) by a waterproof bearing (11) fitted in a reel body (1), while an outer periphery of one side of the rotating shaft (2a) of the rotating member (2) is pivotally supported by a waterproof bearing (12) fitted on a cover (10). A drive gear (2b) is integrally formed on the outer periphery of the rotating shaft (2a) on the one side thereof, while a noncircular detent portion (b), which is formed by a collar portion (2c) and a pair of notches (2d) provided on both sides thereof, a circular supporting portion (a), and a circumferential groove (2e) are formed on the outer periphery of the rotating shaft (2a) on the other side thereof. A resilient member (13) constituted by an 0-ring is fitted in the circumferential groove (2e). A fitting portion (3d), which is formed by a recessed portion formed on an inner wall surface of a central hole (3c) of the gear (3) on one side thereof, is fitted over the noncircular detent portion (b) and the circular supporting portion a) so as to be prevented from rotating. An interlocking gear (9) meshes with a tooth portion (3b) of the gear (3).

8 Claims, 7 Drawing Sheets

FISHING REEL

BACKGROUND OF THE INVENTION

The present invention relates to a fishing reel in which improvements are made to prevent play between a rotating shaft which is rotated by the rotation of a drive mechanism provided in a reel body and a rotation-prevented fitting portion of a gear.

In a fishing reel, a takeup drive mechanism and an oscillation mechanism are conventionally accommodated inside a reel body, and the rotatively driving force of a handle which is rotatably attached to the reel body is transmitted to the takeup drive mechanism and the oscillation mechanism by means of a gear train.

The gear is normally fitted over a shaft in such a manner as to be prevented from rotating, and is arranged such that a noncirular portion such as a spline surface or slot is formed in the shaft, while a hole having a similar shape is formed in the gear, and the two portions are fitted to each other. In this case, since play is likely to occur to the non circular portion, and alignment between the shaft and the gear is difficult, there are cases where the gear becomes eccentric, so that there has been a demand for prompt improvement.

To overcome the above-described drawback, JP-A-9-313079 discloses a technique in which a circular hole and a noncircular portion are formed in a gear, and the noncircular portion of the gear is engaged with a plate having a projection engaging with a noncircular portion of a shaft portion while alignment is being made between the circular portion of the shaft portion and the circular portion of the gear, so as to provide a detent while increasing the alignment accuracy.

However, with the arrangement of the above-described publication, although the alignment accuracy improves, since the prevention of relative rotation of the gear and the shaft is effected by means of a separate member, radial play is large, and it is impossible to suppress play in the direction of thrust. Therefore, abnormal noise and vibration occur during normal winding.

Furthermore, since the number of component parts used is large, and the component parts are difficult to assemble, the fabrication and assembly cost becomes high, rendering the reel expensive.

The problem that the invention is to solve is that if a noncircular portion such as a spline surface or slot is formed in the shaft, while a hole having a similar shape is formed in the gear, and the two portions are fitted to each other, play is likely to occur to the noncircular portion, and alignment between the shaft and the gear is difficult, so that there are cases where the gear becomes eccentric.

To overcome this drawback, if a circular hole and a noncircular portion are formed in a gear, and the noncircular portion of the gear is engaged with a plate having a projection engaging with a noncircular portion of a shaft portion while alignment is being made between the circular portion of the shaft portion and the circular portion of the gear so as to provide a detent while increasing the alignment accuracy, although the alignment accuracy improves, since the prevention of relative rotation of the gear and the shaft is effected by means of a separate member, radial play is large, and it is impossible to suppress play in the direction of thrust. Therefore, abnormal noise and vibration occur during normal winding.

Furthermore since the number of component parts used is large, and the exponent parts are difficult to assemble, the fabrication and assembly cost becomes high, rendering the reel expensive.

SUMMARY OF THE INVENTION

In view of the above-described drawbacks, an object of the invention is to provide a fishing reel in which the alignment accuracy is high and the number of component parts used is small, and which facilitates assembly and is capable of preventing the occurrence of abnormal noise and vibration.

To overcome the above-described problems, a fishing reel including a reel body for accommodating components of a reel and a drive mechanism provided in the reel body for winding a fishline around a spool, comprise: a resilient member interposed between a rotating shaft which is rotated by the rotation of the drive mechanism and a rotation-prevented fitting portion of a gear so as to prevent play between the gear and the rotating shaft.

A fishing reel including a reel body for accommodating components of a reel and a drive mechanism provided in the reel body for winding a fishline around a spool, comprises a rotating shaft which is rotated by the rotation of the drive mechanism and a gear fitted to each other in such a manner as to be prevented from rotating relative to each other, that a hollow cylindrical portion extending from the gear in an axial direction of the rotating shaft is formed, and that a bearing is interposed between the hollow cylindrical portion and the reel body so as to rotatably support the rotating shaft by the reel body.

The resilient member is interposed between fitting portions of the gear and the rotating shaft which is fitted to the gear in such a manner as to be prevented from rotating with respect to the gear so as to prevent play between the gear and the rotating shaft.

The fitting portions of the gear and the rotating shaft are respectively formed by a noncircular detent portion and a circular supporting portion, and the resilient member is interposed between the circular supporting portion and a circular hole portion of the gear so as to prevent the play between the gear and the rotating shaft.

DESCRIPTION OF THE PREFERRED EMBODIMENT

Figure 1:
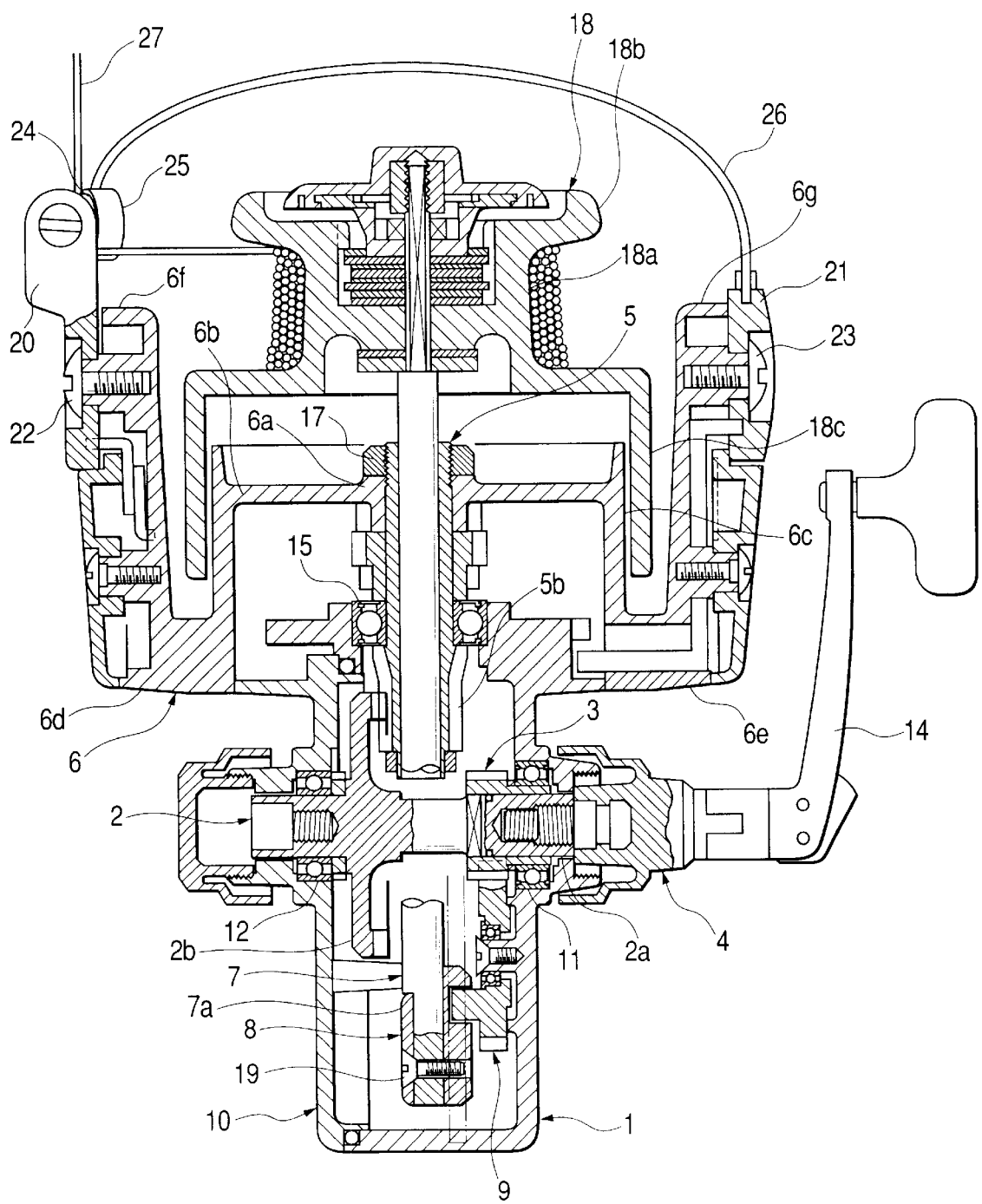
FIG. 1 is a cross-sectional plan view of an essential section of a spinning reel for fishing in accordance with a first embodiment of the invention.

In accordance with the invention, a hollow cylindrical portion 3a of a gear 3 is fitted over a circular supporting portion a of a rotating shaft 2a, the prevention of rotation is effected by a noncircular detent portion b of the rotating shaft 2a and a fitting portion 3d, 3e, or 3g formed by a recessed portion in the gear 3, and the driving force of the rotating shaft 2a is transmitted to the gear 3. Therefore, as compared with the conventional techniques, the number of component parts used is small, and the assembly is facilitated, so that it is possible to lower the fabrication cost and the assembly cost.

In addition, a hollow cylindrical portion 39a of a gear 39 is fitted over a circular supporting portion a of a rotating shaft 35, the prevention of rotation is effected by the noncircular detent portion b of the rotating shaft 35 and a fitting portion 39d formed by a recessed portion in the gear 39, and the driving force of the rotating shaft 35 is transmitted to the gear 39. Therefore, as compared with the conventional techniques, the number of component parts used is small, and the assembly is facilitated, so that it is possible to lower the fabrication cost and the assembly cost.

Since a resilient member 13 or a resilient member 31 constituted by an O-ring is interposed between the circular supporting portion a of the rotating shaft 2a and the hollow cylindrical portion 3a of the gear 3 or between the circular supporting portion a of the rotating shaft 35 and the hollow cylindrical portion 39a of the gear 39, or a resilient member 32 constituted by an O-ring is interposed between the fitting portion 3g and the noncircular detent portion b, the play between the rotating shaft 2a and the fitting portion of the gear 3 or between the rotating shaft 35 and the fitting portion of the gear 39 is reduced. Since the play can be reduced to nil particularly during a light load, it is possible to prevent vibration and abnormal noise during normal winding.

In accordance with the invention, the rotating shaft 2a is fitted in the hollow cylindrical portion 3a of the gear 3, and the hollow cylindrical portion 3a is pivotally supported by a bearing 11 to directly rotate and support the gear 3, it is possible to overcome faulty meshing due to the inclination of the gear 3. Hence, it is possible to prevent the partial wear of the tooth surfaces, prevent abnormal noise and vibration, and improve durability remarkably.

In accordance with the invention, since the resilient member 13 or the resilient member 31 constituted by the O-ring is interposed between the circular supporting portion a of the rotating shaft 2a and the hollow cylindrical portion 3a of the gear 3, it is possible to prevent abnormal noise and vibration and improve durability, and it is possible to prevent the entry of water between the rotating shaft 2a and the gear 3. Therefore, it is possible to provide a reel having high durability and high waterproofness.

Since the prevention of rotation is effected by the noncircular decent portion b of the rotating shaft 2a and the fitting portion 3d formed by the recessed portion in the gear 3, and alignment and axial support are effected by the circular supporting portion a of the rotating shaft 2a and the hollow cylindrical portion 3a of the gear 3, the supporting accuracy of the gear 3 becomes high. In addition, since the arrangement provided is such that the resilient member 13 is interposed on the circular supporting portion a, the formation of a groove for holding the resilient member 13 is facilitated, and processing is simplified. In addition, since the play between the fitting portions of the gear 3 and the rotating shaft 2a is reduced, and the play can be reduced to nil particularly during a light load, it is possible to prevent vibration and abnormal noise during normal winding.

Embodiments

Figure 2:
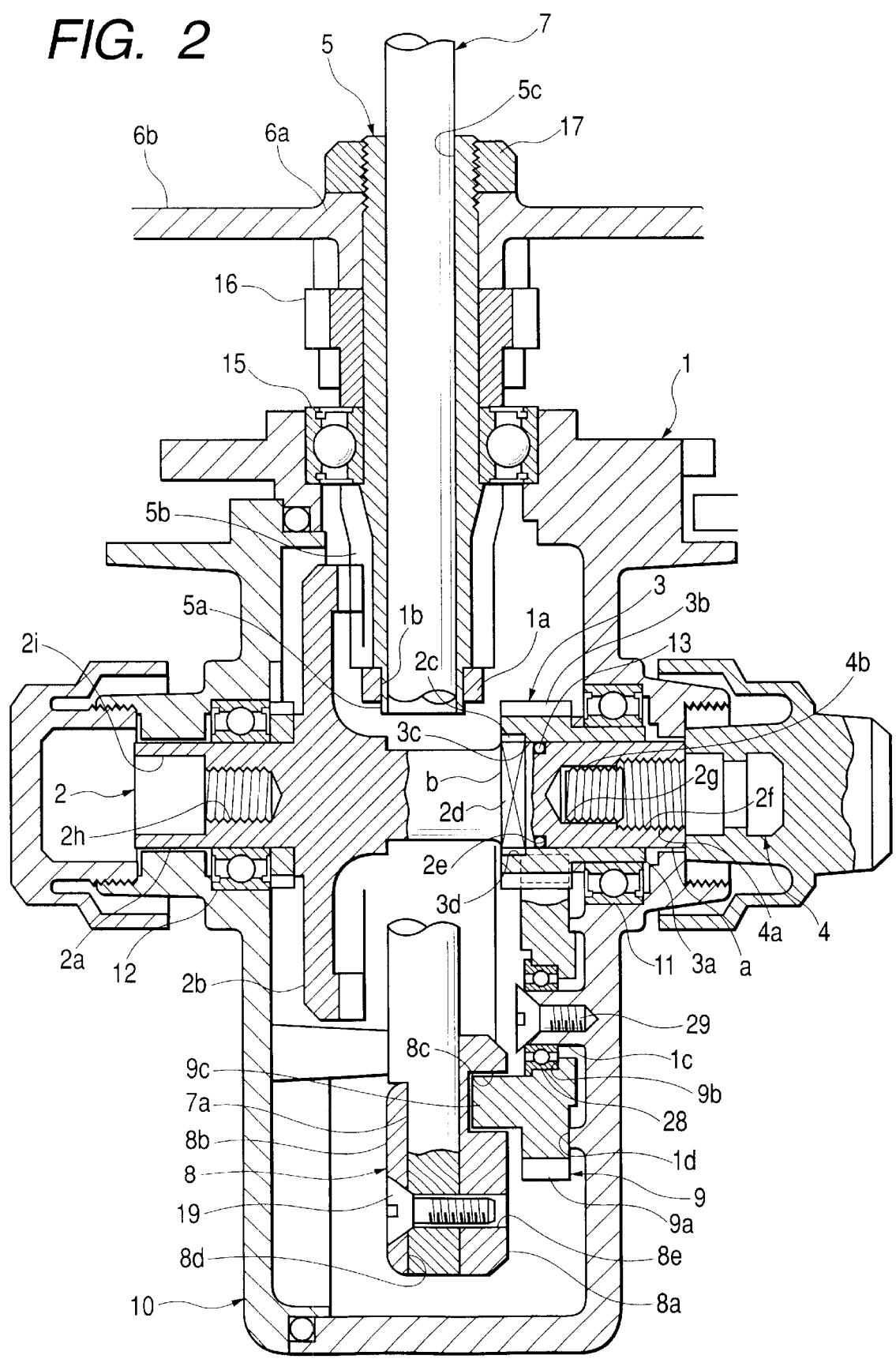
FIG. 2 is an enlarged cross-sectional plan view of the essential section of the spinning reel for fishing in accordance with the first embodiment.
Figure 3:
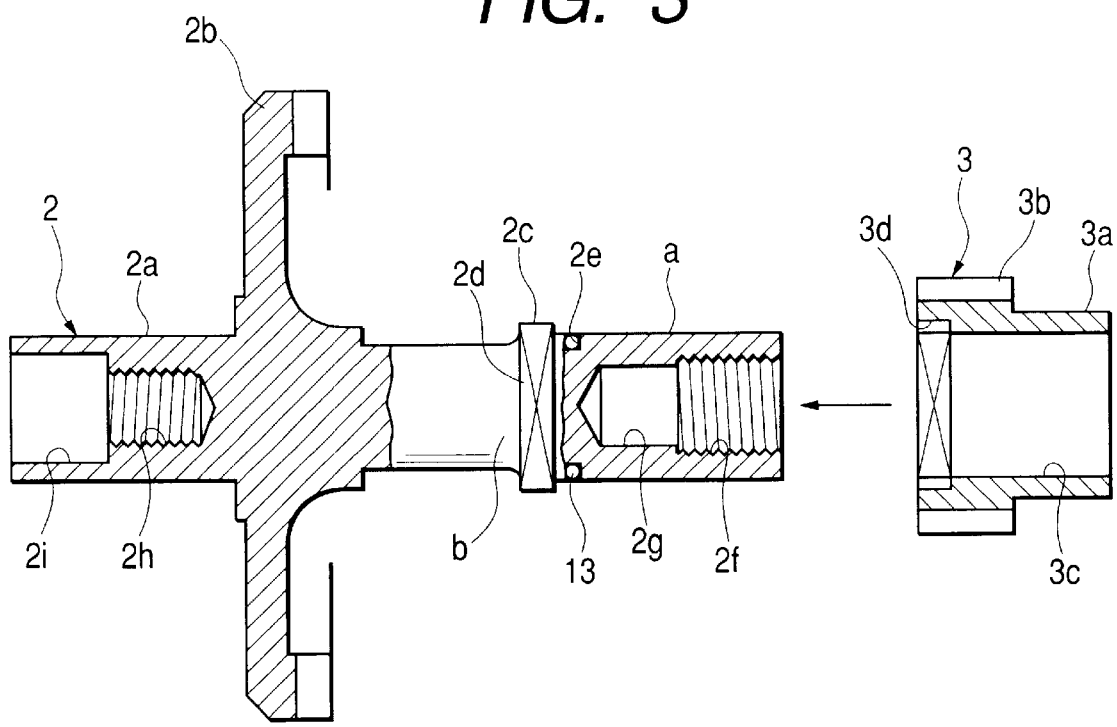
FIG. 3 is an enlarged explosive cross-sectional plan view of a rotating shaft and a gear of the spinning reel for fishing in accordance with the first embodiment.
Figure 4:
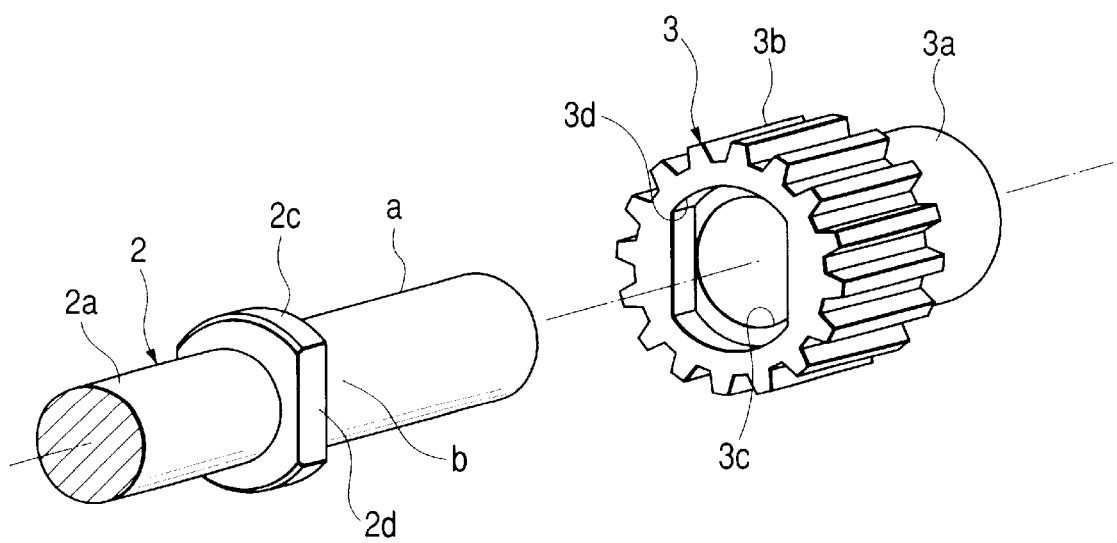
FIG. 4 is an explosive perspective view of the rotating shaft and the gear in accordance with the first embodiment.

Hereafter, a description will be given of the invention with reference to the drawings. FIGS. 1 to 4 illustrate a first embodiment of a fishing reel in which a spinning reel for fishing is used as the fishing reel. FIG. 1 is a cross-sectional plan view of an essential section of the spinning reel for fishing; FIG. 2 is an enlarged cross-sectional plan view of the essential section of the spinning reel for fishing; FIG. 3 is an enlarged explosive cross-sectional plan view of a rotating shaft and a gear; and FIG. 4 is an explosive perspective view of the rotating shaft and the gear.

In the spinning, reel for fishing, an opening of a reel body I on one side thereof is closed by a cover 10, and the cover 30 is attached to the reel body 1 by an unillustrated screw.

An outer periphery of the other side of a rotating shaft 2a of a rotating member 2 is pivotally supported via a hollow cylindrical portion 3a of a gear 3 by a waterproof bearing 11 fitted in the reel body 1, while an outer periphery of one side of the rotating shaft 2a of the rotating member 2 is pivotally supported by a waterproof bearing 12 fitted on the cover 10.

A drive gear 2b is integrally formed on the outer periphery of the rotating shaft 2a on the one side thereof, while a noncircular detent portion b, which is formed by a collar portion 2c and a pair of notches 2d provided on both sides of the collar portion 2c, a circular supporting portion a, and a circumferential groove 2e are formed on the outer periphery of the rotating shaft 2a on the other side thereof.

A resilient member 13 constituted by an O-ring is fitted in the circumferential groove 2e.

The gear 3 is fitted over the noncircular detent portion b and the circular supporting portion a so as to be prevented from rotating.

The hollow cylindrical portion 3a, a gear portion 3b, and a central hole 3c are formed in the gear 3, and a fitting portion 3d, which is formed by a recessed portion into which the noncircular detent portion b is fitted, is formed in an inner well surface of the central hole 3c on one side thereof.

An internally threaded hole 2f, an unloaded hole 2g, an internally threaded hole 2h, and, an unloaded hole 2i are formed in the rotating shaft 2a in that order starting from a right-hand end portion toward the left-hand side as viewed in FIG. 2.

An external thread 4a of a handle shaft 4 is threadedly engaged in the internally threaded hole 2f.

At this time, an external thread 4b of the handle shaft 4 is inserted in the unloaded hole 2q.

When the external thread 4b is threadedly engaged in the internally threaded hole 2h at the time of changing the left end right sides of the handle shaft 4, the external thread 4a is inserted in the unloaded hole 2i.

A handle 14 is connected to the handle shaft 4 in such a manner as to be capable of being folded down.

A rotating shaft cylinder 5 is rotatably supported by a waterproof bearing 15 in a front portion of the reel body 1, and projects to the front side.

A reverse-rotation preventing ratchet wheel 16 and a central shaft cylinder 6a of a rotor 6 are fitted over an outer periphery of the rotating shaft cylinder 5 on the front side of the bearing 15, and are fixed by a nut 17.

A proximal end 5a of the rotating shaft cylinder 5 is pivotally supported in a through hole 1b of a bearing portion 1a, the drive gear 2b meshes with a pinion 5b formed integrally with a front side of the proximal portion 5a, and the rotor 6 is supported so as to be rotated in interlocking relation to the rotation of the handle 14.

A spool shaft 7 with a spool 18 attached to its tip is slidably inserted in a central hole 5c of the rotating shaft cylinder 5 in such a manner as to be capable of reciprocating back and forth, and a sliding member 8 is attached to a detent portion 7a at a rear end of the spool shaft 7 by a screw 19.

The rotor 6 is mounted on the rotating shaft cylinder 5 at its central shaft cylinder 6a, and is comprised of the central shaft cylinder 6a, a front wall 6b, a large-diameter cylinder portion 6c, and a pair of bail supporting arms 6f and 6g projecting forwardly from outer peripheries of proximal portions 6d and 6e of the large-diameter cylinder portion 6c.

One bail supporting member 20 and the other bail supporting member 22 are pivotally supported on outer aides of distal ends of the pair of bail supporting arms 6f and 6g in such a manner as to be reversible between a fishline taking-up position and a fishline releasing position.

An attaching portion 25 of a fishline guide roller 24 is attached to one bail supporting member 20.

One end of a bail 26 is attached to the other bail supporting member 21, while the other and thereof is attached to the attaching portion 25 of the fishline guide roller 24.

A fishline 27 wound around the spool 18 is paid out while being guided by the fishline guide roller 24.

The sliding member 8 is formed by a plate-like body Portion 8a and a projecting portion 8b.

A vertical engaging groove 8c is formed in the body portion 8a, and a laterally oriented rotation-preventing through hole 8d is formed in the projecting portion 8b.

Further, a screw hole 8e which intersects the rotation-preventing through hole 8d at right angles is formed in the projecting portion 8b, and the screw 19 is inserted therein.

The sliding member 8 is provided in such a manner as to be capable of being guided and moved in the back-and-forth direction while its movement in the direction of rotation with respect to the spool shaft 7 is being restricted by an unillustrated shaft lever provided in the back-and-forth direction of the reel body 1.

A gap is formed between opposing surfaces of the sliding member 8 and an interlocking gear 9 so that they do not come into contact with each other, so as to guide the movement of the sliding member 8 in the back-and-forth direction.

A supporting portion 1c which is formed by a shaft cylinder is formed on an inner side wall surface of the reel body 1, and the interlocking gear 9 is pivotally supported on the supporting portion 1c by means of a rolling bearing 28, and is mounted on an annular base portion 1d constituted by a rib formed on the side wall surface.

The interlocking gear 9 is formed in the shape of a spur gear and has a gear portion 9a formed around its periphery, a shaft hole 9b formed in its center, and an engaging projection 9c formed at an eccentric position on its one side surface.

The rolling bearing 28 is inserted in the shaft hole 9b at the center of the interlocking gear 9; and the rolling bearing 28 is prevented from coming off by a screw 29 which is threadedly engaged with the supporting portion 1c constituted by the shaft cylinder inside the reel body 1.

The engaging projection 9c of the interlocking gear 9 is inserted in the engaging groove 8c of the sliding member 8.

The interlocking gear 9 meshes with the gear 3 fitted over the outer periphery of the rotating shaft 2a in such a manner as to be prevented from rotating.

In the first embodiment the gear 3, the interlocking gear 9, and the sliding member 8 form an oscillation mechanism whereby the spool 18 and the spool shaft 7 are reciprocatable in the back-and-forth direction.

The spool 18 is formed by a fishline winding barrel portion 18a at an outer periphery around which the fishline 27 is wound, a collar portion 18b on the front side, and a large-diameter cylinder portion 18c on the rear side.

In the operation of the spinning reel for fishing, if one bail supporting member 20 and the other bail supporting member 21 are at the fishline taking-up position, and the handle 14 is rotated in a direction in which the fishline 27 is wound around the spool 16, the drive gear 2b is rotated, which in turn causes the rotating shaft cylinder 5 to rotate via the pinion 5b, thereby rotating the rotor 6.

When the drive gear 2b is rotated, the rotating shaft 2a is rotated, which in turn causes the gear 3 to rotate, thereby rotating the interlocking gear 9.

As the interlocking gear 9 rotates, the sliding member 8 is linearly reciprocated by the engaging projection 9c to linearly reciprocate the spool shaft 7 and the spool 18. Hence, the fishline 27, while being guided by the fishline guide roller 24 provided on one bail supporting member 20, is wound in parallel around the spool 18 which is reciprocated back and forth.

Namely, the rotating motion of the interlocking gear 9 is converted to the linear reciprocating motion of the sliding member 6, the spool shaft 7, and the spool 18.

As for the gear 3 to which the driving force is transmitted by the rotation of the rotating member 2, the hollow cylindrical portion 3a of the gear 3 is fitted over the circular supporting portion a of the rotating shaft 2a of the rotating member 2 in a state in which the resilient member 13 constituted by the O-ring is interposed between the circular supporting portion a of the rotating shaft 2a and the hollow cylindrical portion 3a. Further, the prevention of rotation is effected by the noncircular detent portion b of the rotating shaft 2a and the fitting portion 3d formed by the recessed portion in the gear 3, and the driving force of the rotating shaft 2a is transmitted to the gear 3. Further the prevention of rotation is effected by the noncircular detent portion b of the rotating shaft 2a and the fitting portion 3d formed by the recessed portion in the gear 3, and the driving force of the rotating shaft 2a is transmitted to the gear 3.

If the fishing reel is constructed as described above, the hollow cylindrical portion 3a of the gear 3 is fitted over the circular supporting portion a of the rotating shaft 2a of the rotating member 2, the prevention of rotation is effected by the noncircular detent portion b of the rotating shaft 2a and the fitting portion 3d formed by the recessed portion in the gear 3, and the driving force of the rotating shaft 2a is transmitted to the gear 3. Therefore, as compared with the conventional techniques the number of component parts used is small, and the assembly is facilitated, so that it is possible to lower the fabrication cost and the assembly cost.

Since the resilient member 13 constituted by the O-ring is interposed between the circular sporting portion s of the rotating shaft 2a of the rotating member 2 and the hollow cylindrical portion 3a of the gear 3, the play between the rotating shaft 2a and the fitting portion of the gear 3 is reduced. Since the play can be reduced to nil particularly during a light load, it is possible to prevent vibration and abnormal wise during normal winding.

Since the rotating shaft 2a of the rotating amber 2 is fitted in the hollow cylindrical portion 3a of the gear 3, and the hollow cylindrical portion 3a is pivotally supported by the bearing 11 to directly rotate and support the gear 3, it is possible to overcome faulty meshing due to the inclination of the gear 3. Hence, it is possible to prevent the partial wear of the tooth surfaces, prevent abnormal noise and vibration, and improve durability remarkably.

Since the resilient member 13 constituted by the O-ring is interposed between the circular supporting portion a of the rotating shaft 2a of the rotating member 2 and the hollow cylindrical portion 3a of the gear 3, it is possible to prevent abnormal noise and vibration and improve durability, and it is possible to prevent the entry of water between the rotating shaft 2a and the gear 3. Therefore, it is possible to provide a reel having high durability and high waterproofness.

Since the prevention of rotation is effected by the noncircular detent portion b of the rotating shaft 2a and the fitting portion 3d formed by the recessed portion is the gear 3, and alignment and axial support are effected by the circular supporting portion a of the rotating shaft 2a and the hollow cylindrical portion 3a of the gear 3, the supporting accuracy of the gear 3 becomes high. In addition, since the arrangement provided is such that the resilient member 13 is interposed on the circular supporting portion a, the formation of the groove for holding the resilient member 13 is facilitated, and processing is simplified. In addition, since the play between the fitting portion of the gear 3 and the rotating shaft 2a is reduced, and the play can be reduced to nil particularly during a light load, it is possible to prevent vibration and abnormal noise during normal winding.

Figure 5:
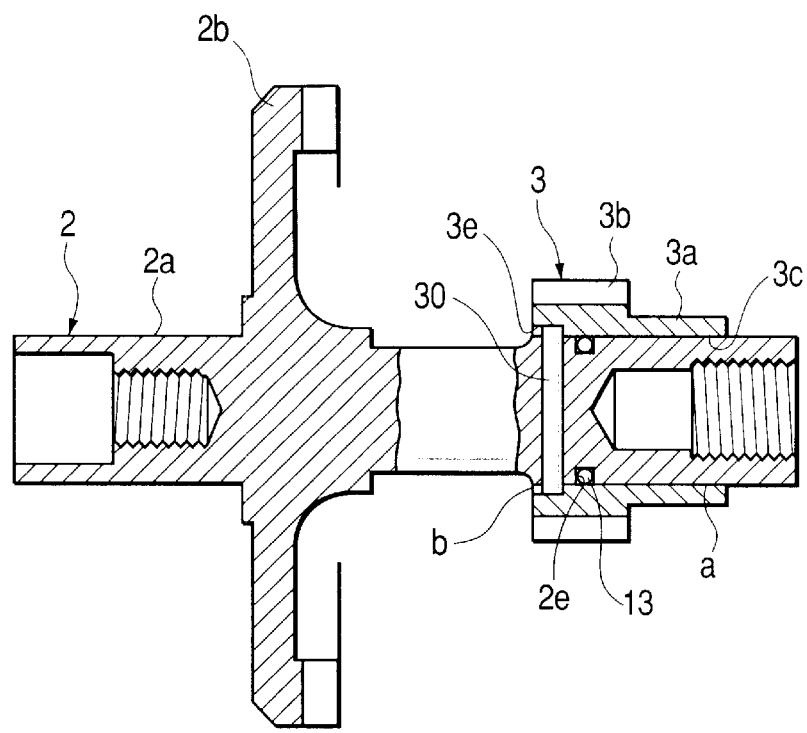
FIG. 5 is an enlarged cross-sectional plan view of the rotating shaft and the gear in accordance with a second embodiment.

FIG. 5 illustrates a second embodiment and is an enlarged cross-sectional plan view of the rotating shaft and the gear.

In the second embodiment, the noncircular detent portion b of the rotating shaft 2a of the rotating member 2 is formed by a pin 30, and a fitting portion 3e formed by a recessed portion, into which the pin 30 can be fitted is formed in the gear 3.

The other arrangements are substantially identical to those of the above-described first embodiment.

Figure 6:
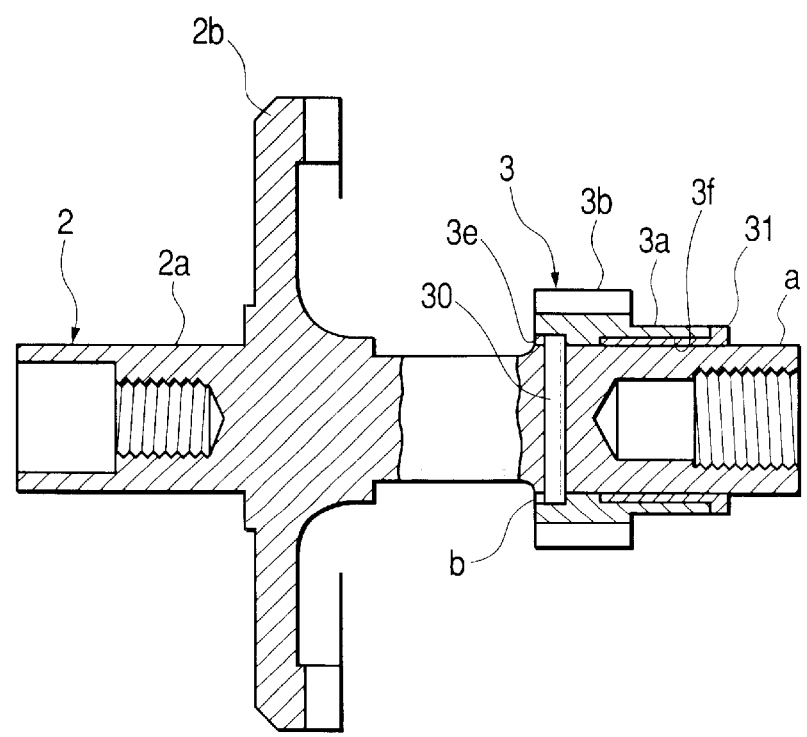
FIG. 6 is an enlarged cross-sectional plan view of the rotating shaft and the gear in accordance with a third embodiment.

FIG. 6 illustrates a third embodiment and is an enlarged cross-sectional plan view of the rotating shaft and the gear.

In the third embodiment, the noncircular detent portion b of the rotating shaft 2a of the rotating member 2 is formed by a pin 30, and a fitting portion 3a foamed by a recessed portion, into which the pin 30 can be fitted, is formed in the gear 3.

The circumferential groove for holding the resilient member constituted by the O-ring is not provided in the circular supporting portion a of the rotating shaft 2a of the rotating member 2. Instead, a large-diameter cylindrical portion 3f As formed in the hollow, cylindrical portion 3a of the gear 3, and a resilient member 31 with a convex cross-sectional shape is fitted thereon.

The other arrangements are substantially identical to those of the above-described first embodiment.

Figure 7:
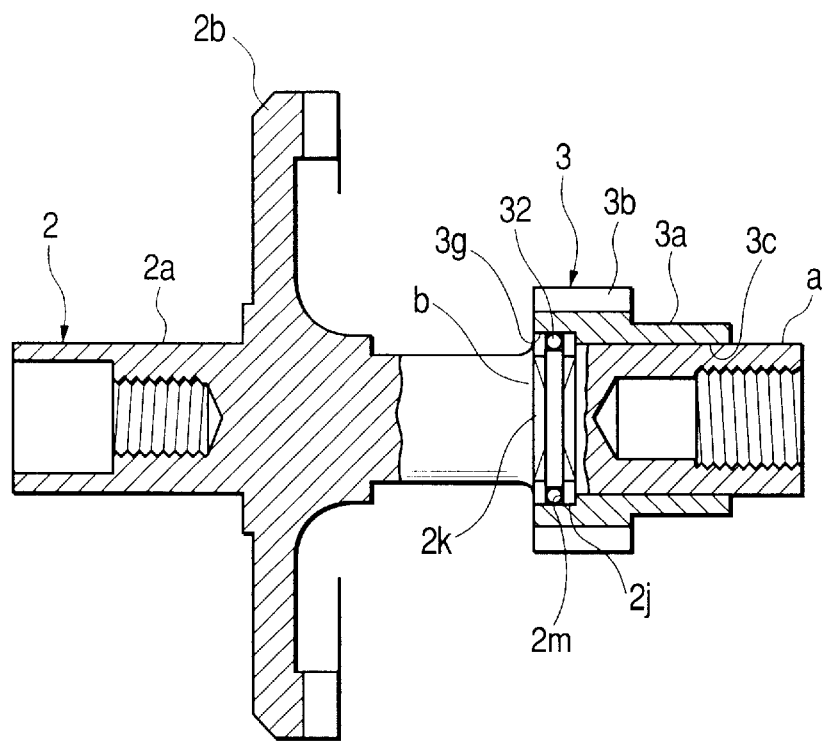
FIG. 7 is an enlarged cross-sectional plan view of the rotating shaft and the gear in accordance with a fourth embodiment.
Figure 8:
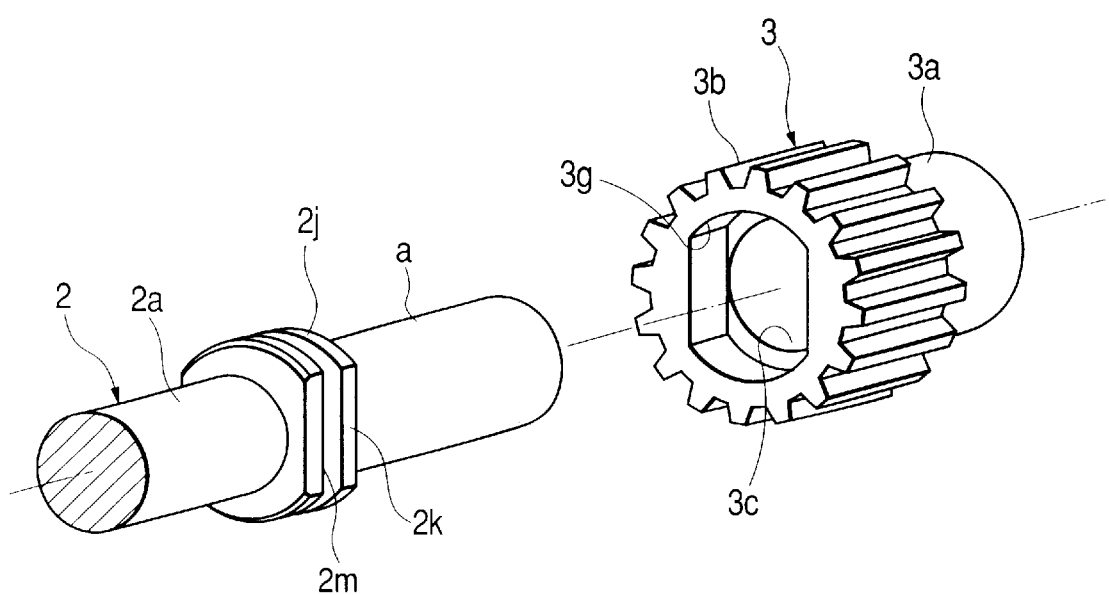
FIG. 8 is an explosive perspective view of the rotating shaft and the gear in accordance with the fourth embodiments.

FIGS. 7 and 8 illustrate a fourth embodiment, in which FIG. 7 is an enlarged cross-sectional plan view of the rotating shaft and the gear, and FIG. 8 is an exploded perspective view of the rotating shaft and the gear.

In the fourth embodiment, the noncircular detent portion b of the rotating shaft 2a of the rotating member 2 is formed by a collar portion 2j, which has a greater thickness than the collar portion 2c in the first embodiment, and a pair of notches 2k provided on both sides of the collar portion 2j. A peripheral groove 2m is formed in the collar portion 2j, and a resilient member 32 constituted by an O-ring is fitted therein.

A fitting portion 3g, which is formed by a recessed portion into which the noncircular detent portion b formed by the collar portion 2j having large thickness is fitted, is formed in an inner wall surface of the central hole 3c of the gear 3 on one side thereof.

The other arrangements are substantially identical to those of the above-described first embodiment.

Figure 9:
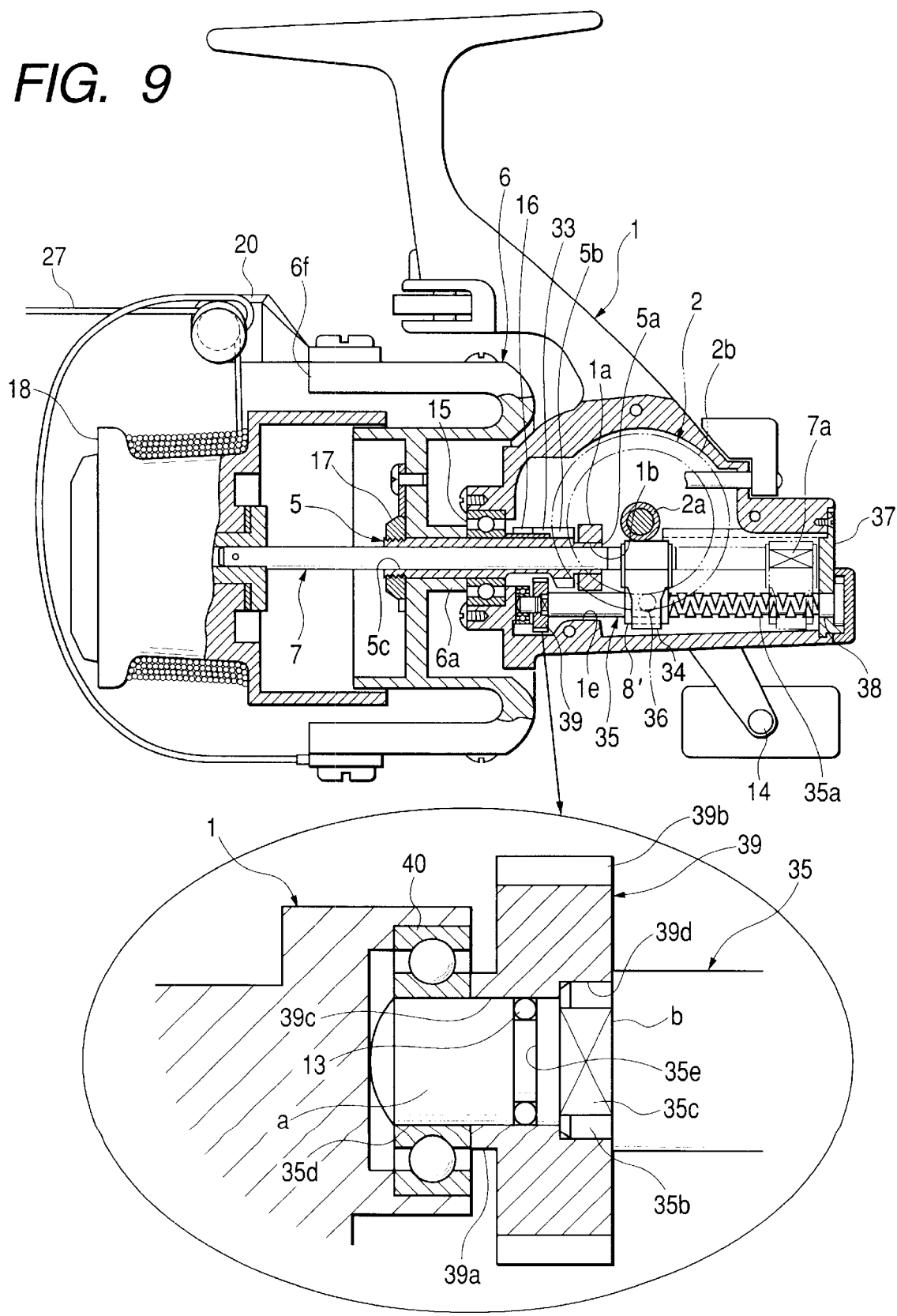
FIG. 9 is a cross-sectional side elevational view of an essential section of the spinning reel for fishing in accordance with a fifth embodiment and an enlarged cross-sectional side elevational view thereof.
Figure 10:
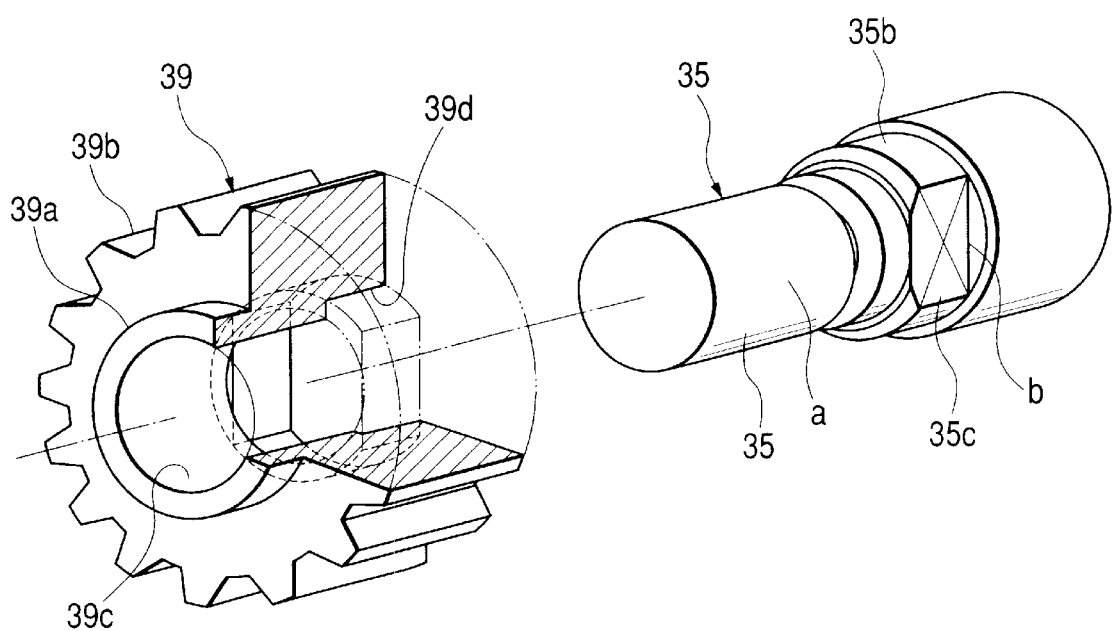
FIG. 10 is an exploded perspective view of the rotating shaft and the gear in accordance with the fifth embodiment.

FIGS. 9 and 10 illustrate a fifth embodiment, in which FIG. 9 is across-sectional side elevational view of an essential section of a spinning reel for fishing and an enlarged cross-sectional side elevational view thereof, and FIG. 10 is an exploded perspective view of the rotating shaft and the gear.

In the fifth embodiment, the rotating shaft cylinder 5 is pivotally supported in the front portion of the reel body 1 by the waterproof bearing 15. and projects toward the front side.

The proximal end 5a of the rotating shaft cylinder 5 is pivotally supported in the through hole 1b of the bearing portion 1a, the pinion 5b is formed integrally with the front side of the proximal portion 5a, and an interlocking gear 33 and the reverse-rotation preventing ratchet wheel 16 are fitted over the outer periphery of the rotating shaft cylinder 5 on the front side of the pinion 5b in such a manner as to be prevented from rotating.

The central shaft cylinder 6a of the rotor 6 is fitted over the outer periphery of the rotating shaft cylinder 5 on the front aide of the bearing 15, and is fixed by the nut 17.

The drive gear 2b meshes with the pinion 5b of the rotating shaft cylinder 5, and the rotor 6 is supported so as to be rotated in interlocking relation to the rotation of the handle 14.

The spool shaft 7 with the spool IS attached to its tip is slidably inserted in the central hole 5c of the rotating shaft cylinder 5 in such a manner as to be capable of reciprocating back and forth, and a sliding member 8' is fitted to the detent portion 7a at a rear end of the spool shaft 7 in such a manner as to be prevented from rotating, and is prevented from coming off by a presser plate 34.

A through hole is foamed in the sliding member 8' in parallel with the spool shaft 7, a rotating shaft 35 constituted by a traverse camshaft is inserted therein. An engaging member 36 provided in the sliding member 8' is engaged in a cam groove 35a of the rotating shaft 35 constituted by the traverse camshaft.

The rotating shaft 35 constituted by the traverse camshaft is passed through an unloaded bole 1e in the bearing portion 1a, and a rear end of the rotating shaft 35 constituted by the traverse camshaft is pivotally supported by a gearing 38 of a side plate 37 attached to the rear side of the reel body 1.

The noncircular detent portion b, which is formed by an intermediate-diameter portion 35b and a pair of notches 35c provided on both sides of the intermediate-diameter portion 35b, the circular supporting portion a formed by a small-diameter portion 35d, and a circumferential groove 35e are formed on a tip of the rotating shaft 35 constituted by the traverse camshaft.

The resilient member 13 constituted by the O-ring is fitted in the circumferential groove 35e.

A gear 39 is fitted over the noncircular detent portion b and the circular supporting portion a so as to be prevented from rotating.

The small-diameter portion 35d at the tip of the rotating shaft 35 constituted by the traverse camshaft is pivotally supported by a bearing 40 fitted in the reel body 1.

A hollow cylindrical portion 39a, a gear portion 39b, and a central hole 39c are formed in the gear 39, and a fitting portion 39d, which is formed by a recessed portion into which the noncircular detent portion b is fitted, is formed in an inner wall surface of the central hole 3c on one side thereof.

The gear 39 meshes with the interlocking gear 33.

In the fifth embodiments the rotating shaft 35 constituted by the traverse camshaft, the gear 39, the interlocking gear 33, and the sliding member 8' form the oscillation mechanism whereby the spool 1e and the spool shaft 7 are reciprocatable in the back-and-forth direction.

The other arrangements are substantially identical to those of the above-described first embodiment.

In the operation of the above-described spinning reel for fishing, if one bail supporting member 20 and the other bail supporting member 21 are at the fishline taking-up position, and the handle 14 is rotated in the direction in which the fishline 27 is wound around the spool 18, the drive gear 2b is rotated, which in turn causes the rotating shaft cylinder 5 to rotate via the pinion 5b, thereby rotating the rotor 6.

When the rotating shaft cylinder 5 is rotated, the gear 39 and the rotating shaft 35 constituted by the traverse camshaft are rotated by means of the interlocking gear 33, which in turn causes the sliding member 8' to reciprocate the spool 18 and the spool shaft 7 back and forth. Hence, the fishline 27, while being guided by the fishline guide roller 24 provided on one bail supporting member 20, is wound in parallel around the spool 18 which is reciprocated back and forth.

As for the gear 39 to which the driving force is transmitted by the rotation of the rotating shaft cylinder 5 and the interlocking gear 33, the hollow cylindrical portion 39a and the central hole 39c of the gear 39 are fitted to the circular supporting portion a of the rotating shaft 35 constituted by the traverse camshaft in a state in which the resilient memnber 13 constituted by the O-ring is interposed between the circular supporting portion a of the rotating shaft 35 and an inner wall surface of the central hole 39c of the gear 39. Further, the prevention of rotation is effected by the noncircular detent portion b of the rotating shaft 35 and the fitting portion 39d formed by the recessed portion in the gear 39, and the driving force of the rotating shaft cylinder 5 is transmitted to the gear 39, and the rotating shaft 35 constituted by the traverse camshaft.

If the fishing reel is constructed as in the fifth embodiment the hollow cylindrical portion 39a and the central hole 39c of the gear 39 are fitted to the circular supporting portion a of the rotating shaft 35, the prevention of rotation is effected by the noncircular detent portion b of the rotating shaft 35 and the fitting portion 39d formed by the recessed portion in the gear 39, and the driving force of the gear 39 is transmitted to the rotating shaft 35. Therefore, as compared with the conventional techniques, the number of component parts used is small, and the assembly is facilitated, so that it is possible to lower the fabrication cost and the assembly cost.

Since the resilient member 13 constituted by the O-ring is interposed between the circular supporting portion a of the rotating shaft 35 and the inner wall surface of the central hole 39c of the gear 39, the play between the rotating shaft 35 and the fitting portion of the gear 39 is reduced. Since the play can be reduced to nil particularly during a light load, it is possible to prevent vibration and abnormal noise during normal Although in the foregoing description a description has been given of the spinning real for fishing as the fishing reel, the invention may be implemented for the rotation-prevented fitting between the rotating shaft and the gear of other type of reel as well.

As described above, the invention is implemented in the above-described forms, and offers the following advantages.

In accordance with claim 1, a hollow cylindrical portion of a gear is fitted over a circular supporting portion of a rotating shaft, the prevention of rotation is effected by a noncircular detent portion of the rotating shaft and a fitting portion formed by a recessed portion in the gear, and the driving force of the rotating shaft is transmitted to the gear. Therefore, as compared with the conventional techniques, the number of component parts used is small, and the assembly is facilitated, so that it is possible to lower the fabrication cost and the assembly cost.

Since a resilient member is interposed between the circular supporting portion of the rotating shaft and the hollow cylindrical portion of the gear, or a resilient member is interposed between the fitting portion and the noncircular detent portion, the play between the rotating shaft and the fitting portion of the gear or between the rotating shaft and the fitting portion of the gear is reduced. Since the play can be reduced to nil particularly during a light load, it is possible to prevent vibration and abnormal noise during normal winding.

In accordance with claim 2, the rotating shaft is fitted in the hollow cylindrical portion of the gear, and the hollow cylindrical portion is pivotally supported by a bearing to directly rotate and support the gear, it is possible to overcome faulty meshing due to the inclination of the gear. Hence, it is possible to prevent the partial wear of the tooth surfaces, prevent abnormal noise and vibration, and improve durability remarkably.

In accordance with claim 3, the resilient member is interposed between the circular supporting portion of the rotating shaft and the hollow cylindrical portion of the gear, it is possible to prevent abnormal noise and vibration and improve durability, and it is possible to prevent the entry of water between the rotating shaft and the gear. Therefore, it is possible to provide a reel having high durability and high waterproofness.

In accordance with claim 4, since the prevention of rotation is effected by the noncircular detent portion of the rotating shaft and the fitting portion formed by the recessed portion in the gear, and alignment and axial support are effected by the circular supporting portion of the rotating shaft 2a and the hollow cylindrical portion of the gear, the supporting accuracy of the gear becomes high. In addition, since the arrangement provided is such that the resilient member is interposed an the circular supporting portion, the formation of a groove for holding the resilient member is facilitated, and processing is simplified. In addition, since the play between the fitting portions of the gear and the rotating shaft is reduced, and the play can be reduced to nil particularly during a light load, it is possible to prevent vibration and abnormal noise during normal winding.

What is claimed is:

1. A fishing reel including a reel body for accommodating components of a reel and a drive mechanism provided in said reel body for winding a fishline around a spool, comprising:

a resilient member interposed between a rotating shaft which is rotated by the rotation of said drive mechanism and a rotation-prevented fitting portion of a gear so as to prevent play between said gear and said rotating shaft.

2. A fishing reel including a reel body for accommodating components of a reel and a drive mechanism provided in said reel body for winding a fishline around a spool, wherein:

a rotating shaft, which is rotated by the rotation of said drive mechanism, and a gear are fitted to each other in such a manner as to be prevented from rotating relative to each other;

a hollow cylindrical portion extending from said gear in an axial direction of said rotating shaft is formed, and a bearing is interposed between said hollow cylindrical portion and said reel body so as to rotatably support said rotating shaft by said reel body, wherein a resilient member is interposed between fitting portions of said gear and said rotating shaft which is fitted to said gear in such a manner as to be prevented from rotating with respect to said gear so as to prevent play between said gear and said rotating shaft.

3. The fishing reel according to claim 1 or 2, wherein said fitting portions of said gear and said rotating shaft are respectively formed by a noncircular detent portion and a circular supporting portion, and said resilient member is interposed between said circular supporting portion and a circular hole portion of said gear so as to prevent the play between said gear and said rotating shaft.

4. A coupling structure, provided to a fishing reel, for coupling a rotary shaft to a hollow cylindrical gear, said structure comprising:

a circular outer surface of the rotary shaft;

a noncircular outer surface of the rotary shaft, contiguous to the circular outer surface of the rotary shaft;

a circular inner surface of the gear, to be fitted to the circular outer surface of the rotary shaft;

a noncircular inner surface of the gear, contiguous to the circular inner surface of the gear, and to be fitted and non-rotatably coupled to the noncircular outer surface of the rotary shaft; and a resilient member provided to at least one of an interface between the circular inner surface of the gear and the circular outer surface of the rotary shaft and an interface between the noncircular inner surface of gear and the noncircular outer surface of the rotary shaft.

5. The structure according to claim 4, wherein the resilient member is installed in an annular groove formed in at least one of the circular outer surface of the rotary shaft, the noncircular outer surface of the rotary shaft, the circular inner surface of the gear and the noncircular inner surface of the gear.

6. The structure according to claim 4, wherein the noncircular outer surface of the rotary shaft is defined by a pin diametrically extending through and protruded from the rotary shaft.

7. The structure according to claim 4, wherein the noncircular outer surface of the rotary shaft is defined by a noncircular collar.

8. The structure according to claim 4, wherein said gear has an outer circular surface that is radially opposite from the circular inner surface of the gear and that is to be fitted to a bearing provided to the fishing reel.

* * * * *